United States Patent
Matsumoto et al.

(10) Patent No.: US 12,497,110 B2
(45) Date of Patent: Dec. 16, 2025

(54) VEHICLE SPAT DEVICE

(71) Applicant: AISIN CORPORATION, Aichi (JP)

(72) Inventors: Kazuya Matsumoto, Kariya (JP); Shuhei Uchida, Kariya (JP); Ryota Tachi, Kariya (JP)

(73) Assignee: AISIN CORPORATION, Kariya (JP)

( * ) Notice: Subject to any disclaimer, the term of this patent is extended or adjusted under 35 U.S.C. 154(b) by 387 days.

(21) Appl. No.: 18/174,075

(22) Filed: Feb. 24, 2023

(65) Prior Publication Data
US 2023/0286599 A1  Sep. 14, 2023

(30) Foreign Application Priority Data
Mar. 8, 2022 (JP) ................. 2022-035471

(51) Int. Cl.
  *B62D 35/00* (2006.01)
  *B62D 27/04* (2006.01)
  *B62D 35/02* (2006.01)

(52) U.S. Cl.
  CPC ........... *B62D 35/005* (2013.01); *B62D 27/04* (2013.01); *B62D 35/02* (2013.01)

(58) Field of Classification Search
  CPC .............................. B62D 35/005; B62D 35/02
  See application file for complete search history.

(56) References Cited

U.S. PATENT DOCUMENTS

| | | | | |
|---|---|---|---|---|
| 9,527,535 | B1* | 12/2016 | Cha | B60R 19/48 |
| 2010/0140976 | A1* | 6/2010 | Browne | B62D 35/005 |
| | | | | 296/180.1 |
| 2014/0076645 | A1* | 3/2014 | McDonald | B62D 35/005 |
| | | | | 296/180.5 |
| 2015/0084369 | A1* | 3/2015 | Niemi | B62D 35/02 |
| | | | | 296/180.1 |
| 2017/0106922 | A1* | 4/2017 | Povinelli | B62D 37/02 |
| 2017/0120968 | A1* | 5/2017 | Povinelli | B62D 37/02 |
| 2018/0134332 | A1* | 5/2018 | Cha | B62D 35/007 |
| 2018/0162459 | A1* | 6/2018 | Abdoul Azizou | H02P 6/16 |
| 2019/0152543 | A1* | 5/2019 | Shiga | B62D 37/02 |
| 2021/0061373 | A1* | 3/2021 | Guyon | B62D 35/005 |
| 2021/0139088 | A1* | 5/2021 | Tachi | B62D 35/005 |

(Continued)

FOREIGN PATENT DOCUMENTS

| | | |
|---|---|---|
| JP | 2016-094073 A | 5/2016 |
| JP | 2019-151303 A | 9/2019 |

*Primary Examiner* — Gregory A Blankenship
(74) *Attorney, Agent, or Firm* — Finnegan, Henderson, Farabow, Garrett and Dunner, LLP

(57) ABSTRACT

A vehicle spat device includes; a variable support mechanism configured to support a spat serving as an aerodynamic member at an expanded position in front of a wheel and a retracted position separated from the expanded position; an impact relaxation mechanism configured to allow retreating operation accompanied by displacement of the spat based on input of an external force to the spat; and a drive mechanism configured to apply a drive force to the variable support mechanism to cause the spat to operate between an expanded position and a retracted position as an operating range. The impact relaxation mechanism allows the retreating operation of the spat supported at the retracted position to a retreating position positioned further closer to a vehicle body side than the retracted position.

8 Claims, 12 Drawing Sheets

(56) References Cited

U.S. PATENT DOCUMENTS

| | | | |
|---|---|---|---|
| 2022/0153356 A1* | 5/2022 | Salter | B62D 37/02 |
| 2023/0071962 A1* | 3/2023 | Mizuno | B62D 35/02 |
| 2023/0094082 A1* | 3/2023 | Ando | B62D 35/02 |
| | | | 296/180.5 |
| 2023/0094537 A1* | 3/2023 | Ando | B62D 35/02 |
| | | | 296/181.5 |
| 2023/0094610 A1* | 3/2023 | Ando | B62D 35/005 |
| | | | 296/180.1 |
| 2023/0099045 A1* | 3/2023 | Ando | B62D 35/02 |
| | | | 296/180.5 |
| 2023/0174171 A1* | 6/2023 | Hung | B62D 35/005 |
| | | | 296/180.5 |
| 2023/0286599 A1* | 9/2023 | Matsumoto | B62D 37/02 |
| 2024/0051623 A1* | 2/2024 | Tachi | B62D 35/02 |
| 2024/0308601 A1* | 9/2024 | Matsumoto | B62D 35/005 |
| 2025/0115310 A1* | 4/2025 | Honma | B62D 35/02 |

* cited by examiner

VEHICLE SPAT DEVICE

CROSS REFERENCE TO RELATED APPLICATIONS

This application is based on and claims priority under 35 U.S.C. § 119 to Japanese Patent Application No. 2022-035471, filed on Mar. 8, 2022, the entire content of which is incorporated herein by reference.

TECHNICAL FIELD

The present disclosure relates to a vehicle spat device.

BACKGROUND DISCUSSION

Conventionally, there has been a vehicle spat device in which a spat serving as an aerodynamic member is disposed in front of a wheel to straighten a traveling wind hitting the wheel. For example, Japanese Patent Application Laid-Open No. 2016-94073 discloses a movable spat device including a variable support mechanism that supports the spat at an expanded position in front of a wheel and a retracted position separated from the expanded position. Furthermore, the spat device includes an impact relaxation mechanism that allows a retreating operation in which the spat moves upward when an external force is input to the spat supported at the expanded position from the vehicle front side. Then, accordingly, for example, when the spat disposed at the expanded position interferes with an obstacle during vehicle traveling, the impact load applied to the spat can be relaxed.

However, in an actual use environment, the vehicle may travel with the spat disposed at the retracted position. Furthermore, even in such a traveling situation, for example, when the vehicle goes over a step on a road surface, an external force that thrusts up the spat supported at the retracted position from below may be input. Then, in such a case, in the configuration of the conventional technique, there is a possibility that the impact load applied to the spat supported at the retracted position cannot be effectively relaxed.

A need thus exists for a vehicle spat device which is not susceptible to the drawback mentioned above.

SUMMARY

A vehicle spat device includes: a variable support mechanism configured to support a spat serving as an aerodynamic member at an expanded position in front of a wheel and a retracted position separated from the expanded position; an impact relaxation mechanism configured to allow retreating operation accompanied by displacement of the spat based on input of an external force to the spat; and a drive mechanism configured to apply a drive force to the variable support mechanism to cause the spat to operate between an expanded position and a retracted position as an operating range. The impact relaxation mechanism allows the retreating operation of the spat supported at the retracted position to a retreating position positioned further closer to a vehicle body side than the retracted position.

A vehicle spat device includes: a variable support mechanism configured to support a spat serving as an aerodynamic member at an expanded position in front of a wheel and a retracted position separated from the expanded position; and an impact relaxation mechanism configured to allow retreating operation accompanied by displacement of the spat based on input of an external force to the spat. The impact relaxation mechanism is interposed between the variable support mechanism and the spat to allow the retreating operation based on a relative displacement of the spat with respect to the variable support mechanism.

BRIEF DESCRIPTION OF THE DRAWINGS

The foregoing and additional features and characteristics of this disclosure will become more apparent from the following detailed description considered with the reference to the accompanying drawings; wherein.

DETAILED DESCRIPTION

Hereinafter, an embodiment of a vehicle spat device will be described with reference to the drawings.

Figure 1:
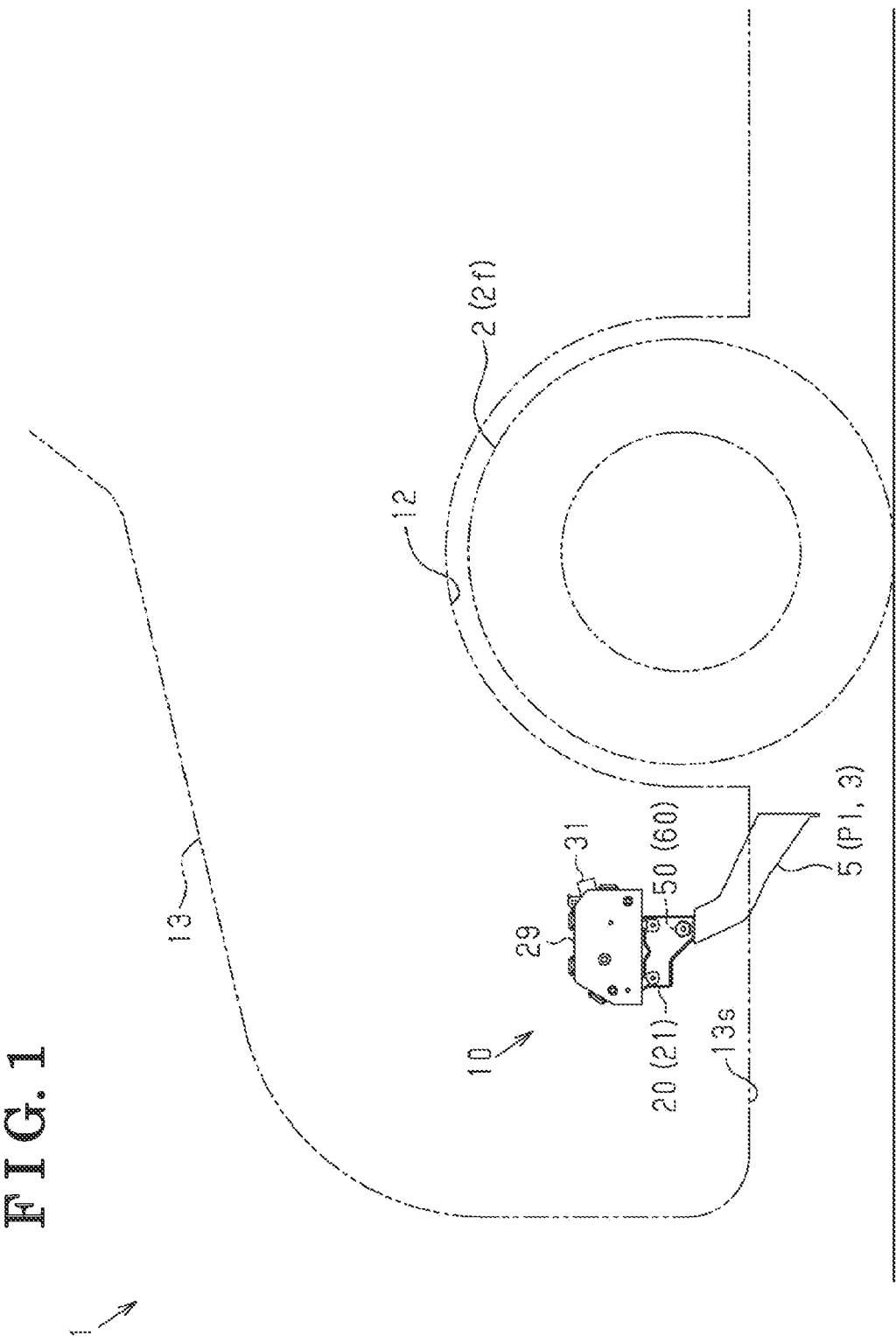
FIG. 1 is a side view of a spat device provided in a vehicle.

As shown in FIG. 1, the vehicle 1 of the present embodiment includes a spat device 10 in which a spat 5 to be the aerodynamic member 3 is disposed in front of the wheel 2 (left side in FIG. 1). Specifically, in the vehicle 1 of the present embodiment, the spat device 10 is provided on the vehicle body 13 at a position in front of the wheel house 12 housing the front wheel 2f of the vehicle 1. Furthermore, in the spat device 10 of the present embodiment, at a position in front of the wheel 2 at which the spat device 10 is provided, a flap portion 15 of the spat 5 functioning as the aerodynamic member 3 is disposed below the vehicle body 13 (lower side in FIG. 1). Then, accordingly, the spat device 10 of the present embodiment has a configuration capable of improving the aerodynamic performance of the vehicle 1 by straightening the traveling wind hitting the wheel 2.

Figure 2:
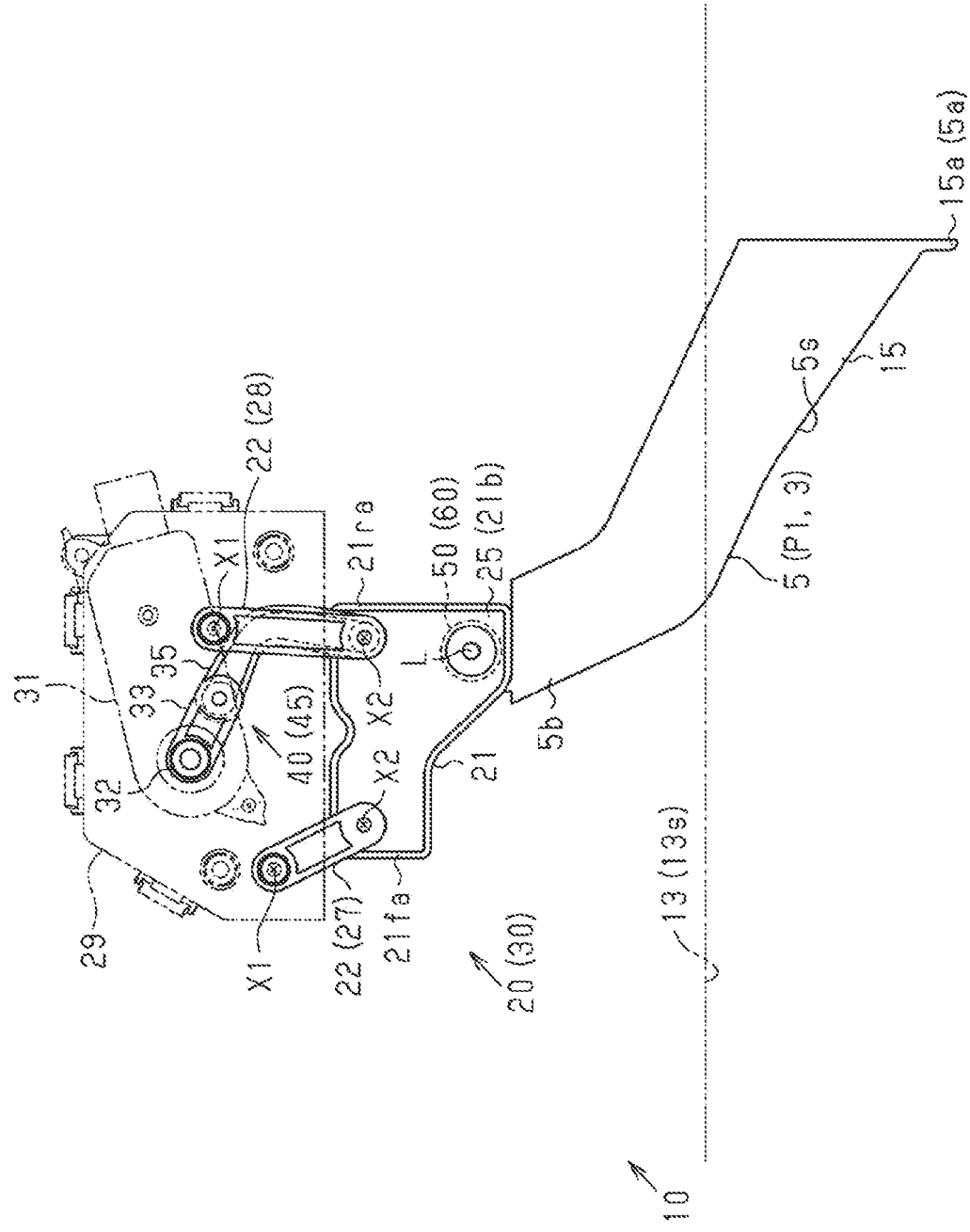
FIG. 2 is a side view of the spat device in a state where the spat is supported at an expanded position.
Figure 3:
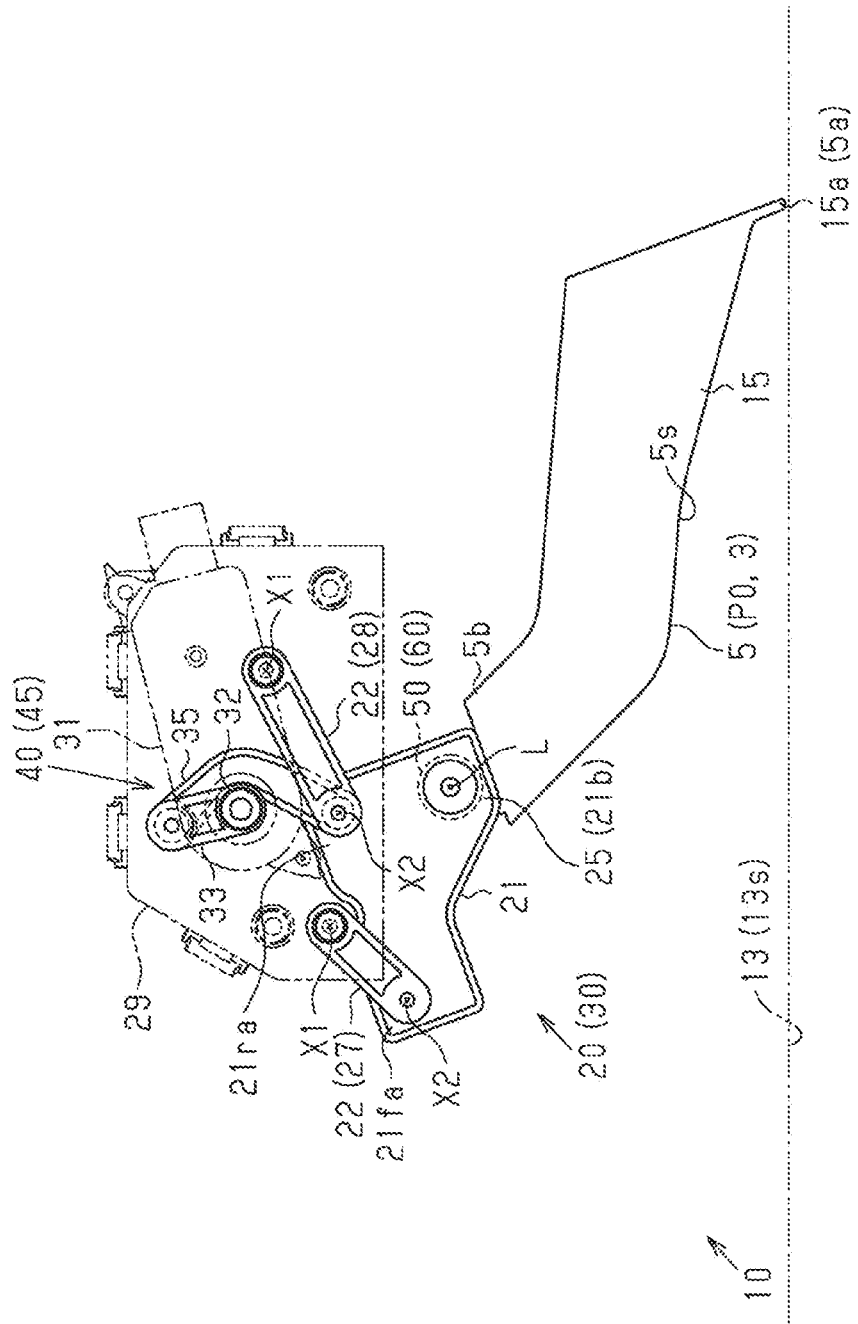
FIG. 3 is a side view of the spat device in a state where the spat is supported at a retracted position.

In addition, as shown in FIGS. 1 to 3, in the vehicle 1 of the present embodiment, as described above, the supporting position of the spat 5 in which the flap portion 15 is disposed in front of the wheel 2 and below the lower surface 13*s* of the vehicle body 13 is set to the expanded position P1 of the spat 5. Furthermore, in the vehicle 1 of the present embodiment, the retracted position P0 of the spat 5 is set at a position where the spat 5 is separated upward from the expanded position P1. Specifically, the retracted position P0 in the vehicle 1 of the present embodiment is set at a position where the tip 15*a* of the flap portion 15 is disposed above the lower surface 13*s* of the vehicle body 13 in a state where the spat 5 is supported at the retracted position P0. Then, the spat device 10 of the present embodiment includes a variable support mechanism 20 that supports the spat 5 at these two positions of the expanded position P1 and the retracted position P0.

That is, the straightening effect of the spat 5 disposed in front of the wheel 2 becomes more remarkable during high-speed traveling. Based on this point, the spat device 10 of the present embodiment has a movable configuration in which the spat 5 supported by the variable support mechanism 20 can be disposed at the expanded position P1 and disposed at the retracted position P0 separated from the expanded position P1.

Specifically, when the vehicle 1 is in a stopped state, the spat device 10 of the present embodiment supports the spat 5 at the retracted position P0. In addition, when the traveling speed of the vehicle 1 becomes equal to or higher than a predetermined speed, the spat device 10 moves the spat 5 from the retracted position P0 to the expanded position P1. Furthermore, when the traveling speed of the vehicle 1 becomes equal to or lower than a predetermined speed, the spat device 10 again moves the spat 5 from the expanded position P1 to the retracted position P0. Then, accordingly, the spat device 10 of the present embodiment is configured so that the spat 5 is supported at the retracted position P0 during low-speed traveling.

Figure 4:
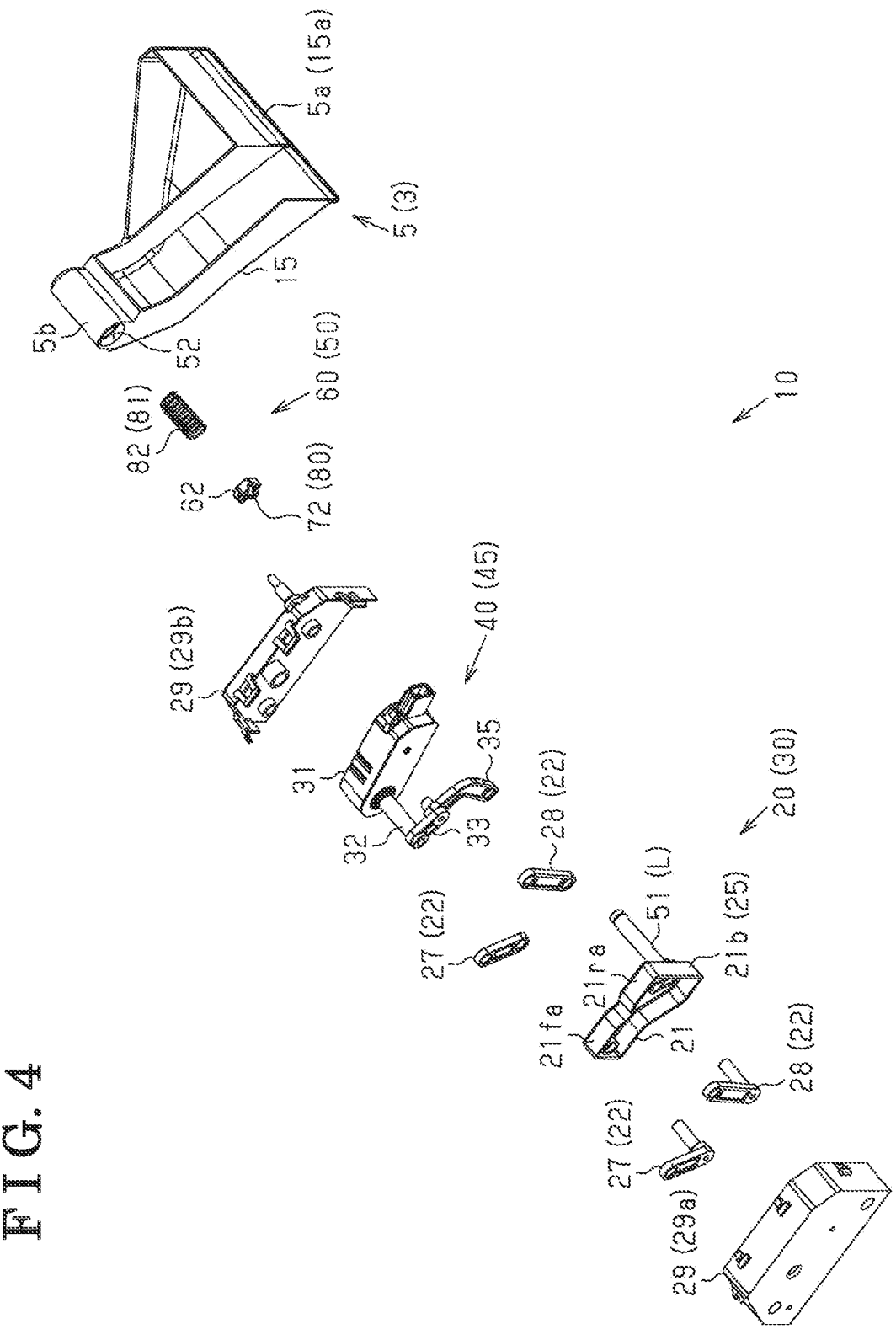
FIG. 4 is an exploded perspective view of the spat device.

More specifically, as shown in FIGS. 2 to 4, in the spat device 10 of the present embodiment, the variable support mechanism 20 includes a spat base 21 to which the spat 5 is coupled, and a plurality of link members 22.

Specifically, the spat base 21 of the present embodiment has a substantially flat-shaped outer shape extending in the front-rear direction (left-right direction in FIGS. 2 and 3) and the vertical direction (in each drawing, vertical direction) of the vehicle 1. Then, the spat base 21 includes a coupling portion 25 with the spat 5 at a position serving as a lower end 21*b* thereof (lower position in FIGS. 2 and 3).

In addition, the spat device 10 of the present embodiment includes a pair of front links 27 and 27 pivotably coupled to the coupling in a state of sandwiching the flat plate shape in the thickness direction (in FIGS. 2 and 3, a direction orthogonal to the paper surface) near the front upper end portion 21*fa* of the spat base 21. Furthermore, the spat device 10 of the present embodiment similarly includes a pair of rear links 28 and 28 pivotably coupled to the coupling in a state of sandwiching the flat plate shape in the thickness direction near the rear upper end portion 21*ra* of the spat base 21. Then, the spat device 10 of the present embodiment has a configuration in which each pair of the front links 27 and 27 and the rear links 28 and 28 is pivotably coupled to the vehicle body 13 to form the variable support mechanism 20 of the spat 5.

Specifically, the spat device 10 of the present embodiment includes a flat substantially box-shaped case 29 that stores the front links 27 and 27 and the rear links 28 and 28 therein.

In the spat device 10 of the present embodiment, the case 29 is formed by fitting a pair of divided members 29*a* and 29*b* in the thickness direction. In addition, the case 29 is fixed to the vehicle body 13 in a state of extending in the vehicle front-rear direction and the vertical direction. Furthermore, the case 29 has pivot coupling points X1 of the front links 27 and 27 and the rear links 28 and 28 on the inside thereof. That is, in the spat device 10 of the present embodiment, since the case 29 is fixed to the vehicle body 13, the front links 27 and 27 and the rear links 28 and 28 have the pivot coupling points X1 with respect to the vehicle body 13 and the pivot coupling points X2 with respect to the spat base 21. Then, in the spat device 10 of the present embodiment, the variable support mechanism 20 of the spat 5 is formed by the four-node link mechanism 30 formed by the respective link members 22 and the spat base 21.

That is, in the variable support mechanism 20 of the present embodiment, pivoting of the front links 27 and 27 and the rear links 28 and 28 displaces the spat base 21 supported by the front links 27 and 27 and the rear links 28 and 28. Then, accordingly, the spat device 10 of the present embodiment is configured so that the spat 5 coupled to the spat base 21 can be moved from the retracted position P0 to the expanded position P1 and can be moved from the expanded position P1 to the retracted position P0.

Specifically, during the expanding operation of the spat 5, the front links 27 and 27 and the rear links 28 and 28 pivot counterclockwise in FIGS. 2 and 3 around the pivot coupling points X1 with respect to the vehicle body 13. In addition, by this pivoting, the spat base 21 coupled to the front links 27 and 27 and the rear links 28 and 28 is pulled down to the vehicle rear side. Then, accordingly, in the variable support mechanism 20 of the present embodiment, the spat 5 coupled to the spat base 21 moves from the retracted position P0 to the expanded position P1.

On the other hand, during the retracting operation of the spat 5, the front links 27 and 27 and the rear links 28 and 28 pivot clockwise in FIGS. 2 and 3 around the pivot coupling points X1 with respect to the vehicle body 13. In addition, by this pivoting, the spat base 21 coupled to the front links 27 and 27 and the rear links 28 and 28 is lifted to the vehicle front side. Then, accordingly, the variable support mechanism 20 of the present embodiment is configured so that the spat 5 coupled to the spat base 21 moves from the expanded position P1 to the retracted position P0.

Furthermore, the variable support mechanism 20 of the present embodiment is configured so that the spat base 21 lifted upward takes a forward tilting attitude of "frontward downward" during the retracting operation. That is, due to the forward tilting attitude of the spat base 21 during the retracting operation, the tip portion 5*a* side of the spat 5 coupled to the lower end 21*b* of the spat base 21, that is, the tip 15*a* of the flap portion 15 is lifted upward. Then, accordingly, the spat device 10 of the present embodiment is configured so that the pressure receiving surface 5*s* of the spat 5 supported at the retracted position P0 is disposed downward.

In addition, the spat device 10 of the present embodiment includes an actuator 31 using a motor (not shown) as a drive source. Then, by transmitting the drive force of the actuator 31 to the variable support mechanism 20, the spat 5 supported by the variable support mechanism 20 is configured to operate in an expanding and a retracting manner.

Specifically, the actuator 31 of the present embodiment includes an output shaft 32 that pivots by motor drive, and an output lever 33 that pivots integrally with the output shaft 32. In addition, the spat device 10 of the present embodiment includes a coupling link 35 pivotably coupled to the output lever 33 and pivotably coupled to the spat base 21 to which the spat 5 is coupled. In the spat device 10 of the present embodiment, the coupling link 35 has a substantially L-shaped bent shape. Furthermore, the coupling link 35 has one end side coupled to the tip portion of the output lever 33, and the other end side coupled to the spat base 21 at a pivot coupling point X2 of the rear links 28 and 28 formed at the rear upper end portion 21 *ra* of the spat base 21. Then, accordingly, in the spat device 10 of the present embodiment, by applying a drive force to the variable support mechanism 20, a drive mechanism 40 that causes the spat 5 supported by the variable support mechanism 20 to operate in an expanding and a retracting manner is formed.

More specifically, in the spat device 10 of the present embodiment, in the drive mechanism 40, during the expanding operation of the spat 5, the output lever 33 of the actuator 31 pivots in the clockwise direction in FIGS. 2 and 3 integrally with the output shaft 32. Furthermore, due to the pivoting of the output lever 33, the coupling link 35 interposed between the output lever 33 and the spat base 21 pushes down the rear upper end portion 21*ra* of the spat base 21 downward. Then, accordingly, the drive mechanism 40 of the present embodiment moves the spat 5 coupled to the spat base 21 from the retracted position P0 to the expanded position P1 based on the operation of the variable support mechanism 20 formed by the spat base 21.

In addition, in the drive mechanism 40 of the present embodiment, during the retracting operation of the spat 5, the output lever 33 of the actuator 31 pivots in the counterclockwise direction in FIGS. 2 and 3 integrally with the output shaft 32, Furthermore, due to the pivoting of the output lever 33, the coupling link 35 interposed between the output lever 33 and the spat base 21 pulls up the rear upper end portion 21*ra* of the spat base 21 upward. Then, accordingly, the drive mechanism 40 of the present embodiment is configured to move the spat 5 coupled to the spat base 21 from the expanded position P1 to the retracted position P0 based on the operation of the variable support mechanism 20.

Furthermore, the drive mechanism 40 of the present embodiment forms a turnover mechanism 45 based on the substantially L-shaped bent shape assigned to the coupling link 35, Then, accordingly, the spat device 10 of the present embodiment is configured so that the expanding operation and the retracting operation of the spat 5 by the reverse input are regulated.

Specifically, when the spat 5 supported at the expanded position P1 performs the retracting operation, the spat 5 performs the retracting operation in a mode of slightly moving backward once and then moving forward due to the restriction of the turnover mechanism 45 formed by the drive mechanism 40. Then, accordingly, even when the actuator 31 is stopped, the spat device 10 of the present embodiment can stably support the spat 5 at the expanded position P1 against the wind pressure of the traveling wind that pushes down the pressure receiving surface 5*s* rearward.

In addition, when the spat 5 supported at the retracted position P0 performs the expanding operation, the spat 5 performs the expanding operation in a mode of slightly moving upward once and then moving downward due to the restriction of the turnover mechanism 45 formed by the drive mechanism 40, Then, accordingly, even when the actuator 31 is stopped, the spat device 10 of the present embodiment can stably support the spat 5 at the retracted position P0 against the gravity.

(Impact Relaxation Mechanism)

Next, the impact relaxation mechanism provided in the spat device 10 of the present embodiment will be described.

Figure 5:
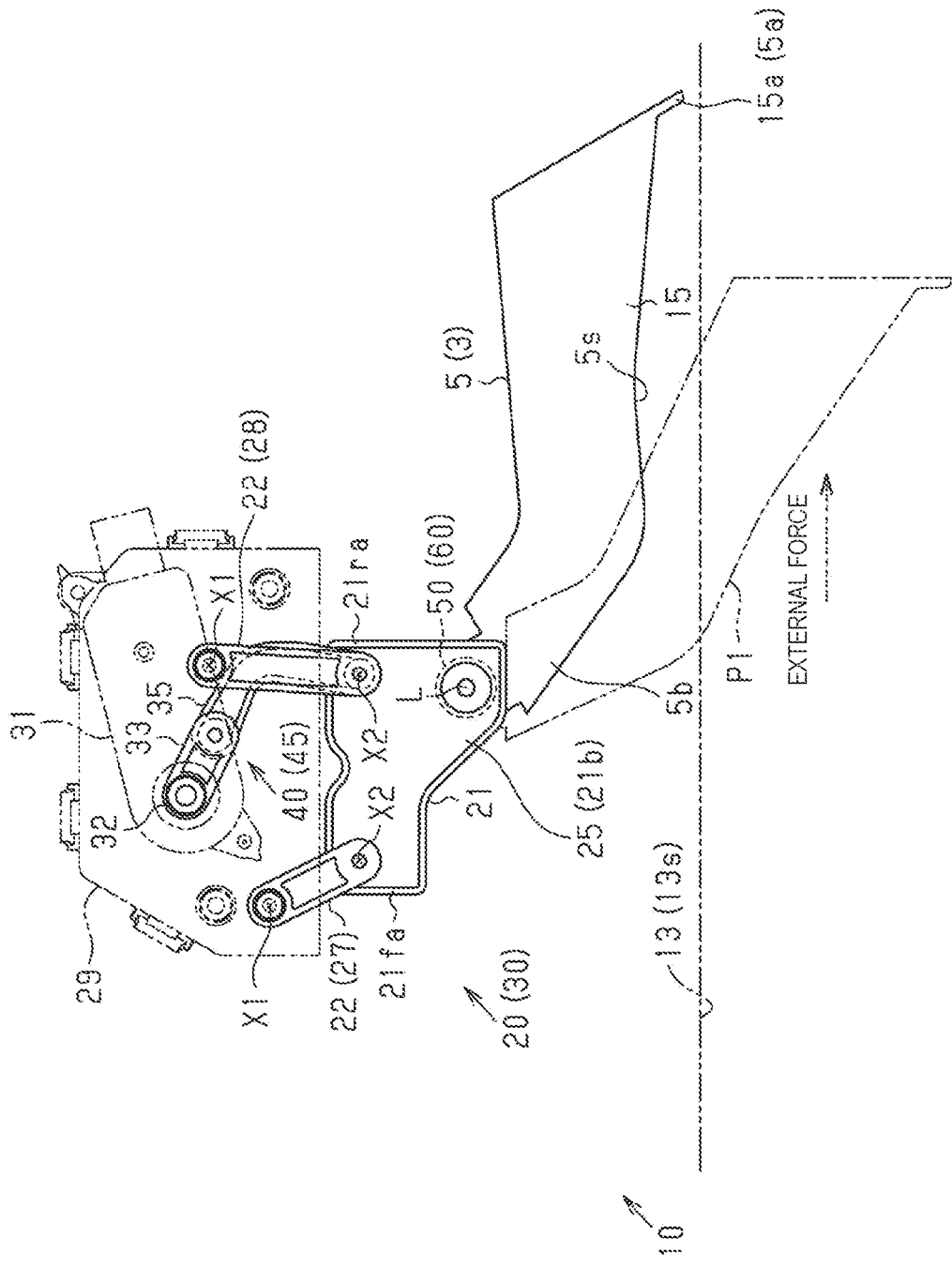
FIG. 5 is a side view of the spat device in a state in which the spat supported at the expanded position has performed retreating operation.
Figure 6:
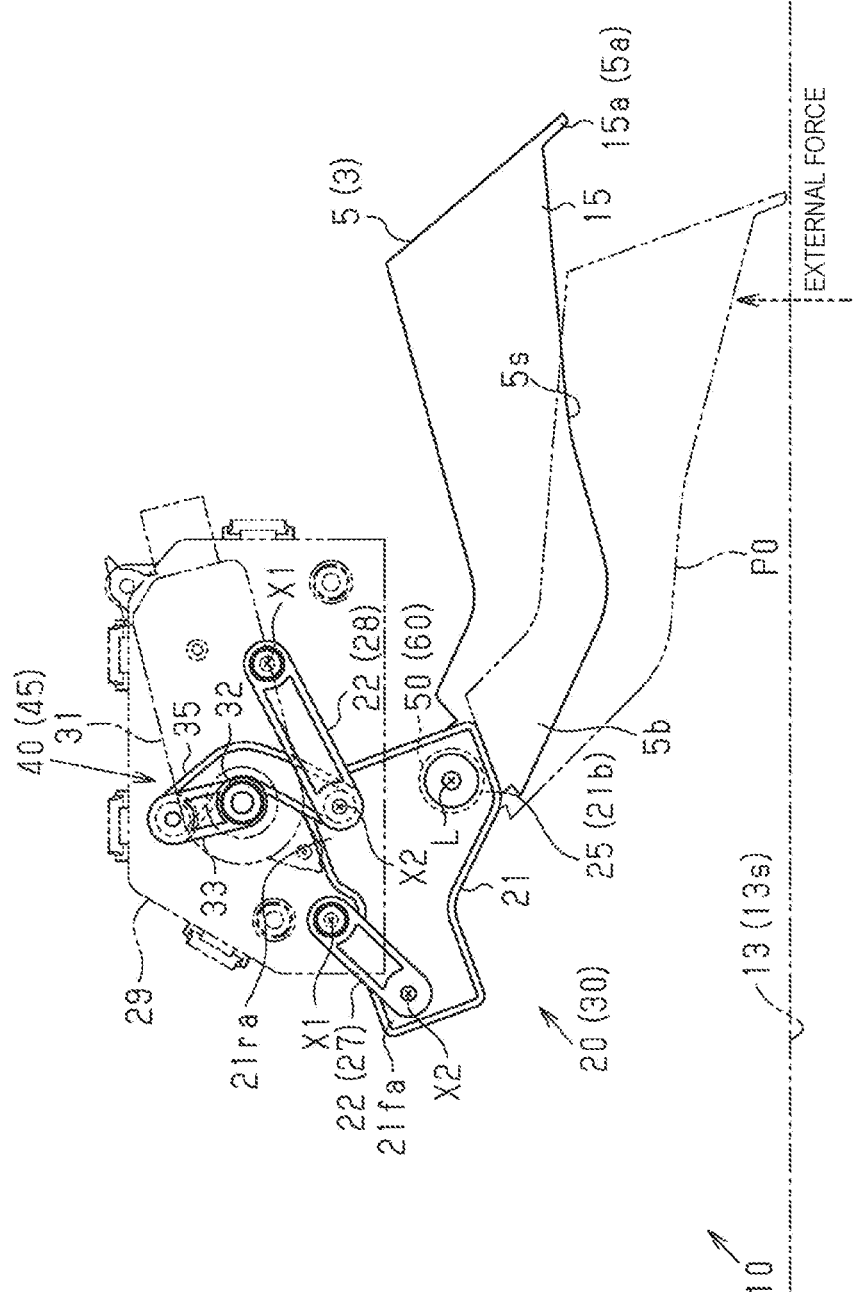
FIG. 6 is a side view of the spat device in a state in which the spat supported at the retracted position has performed retreating operation.
Figure 7:
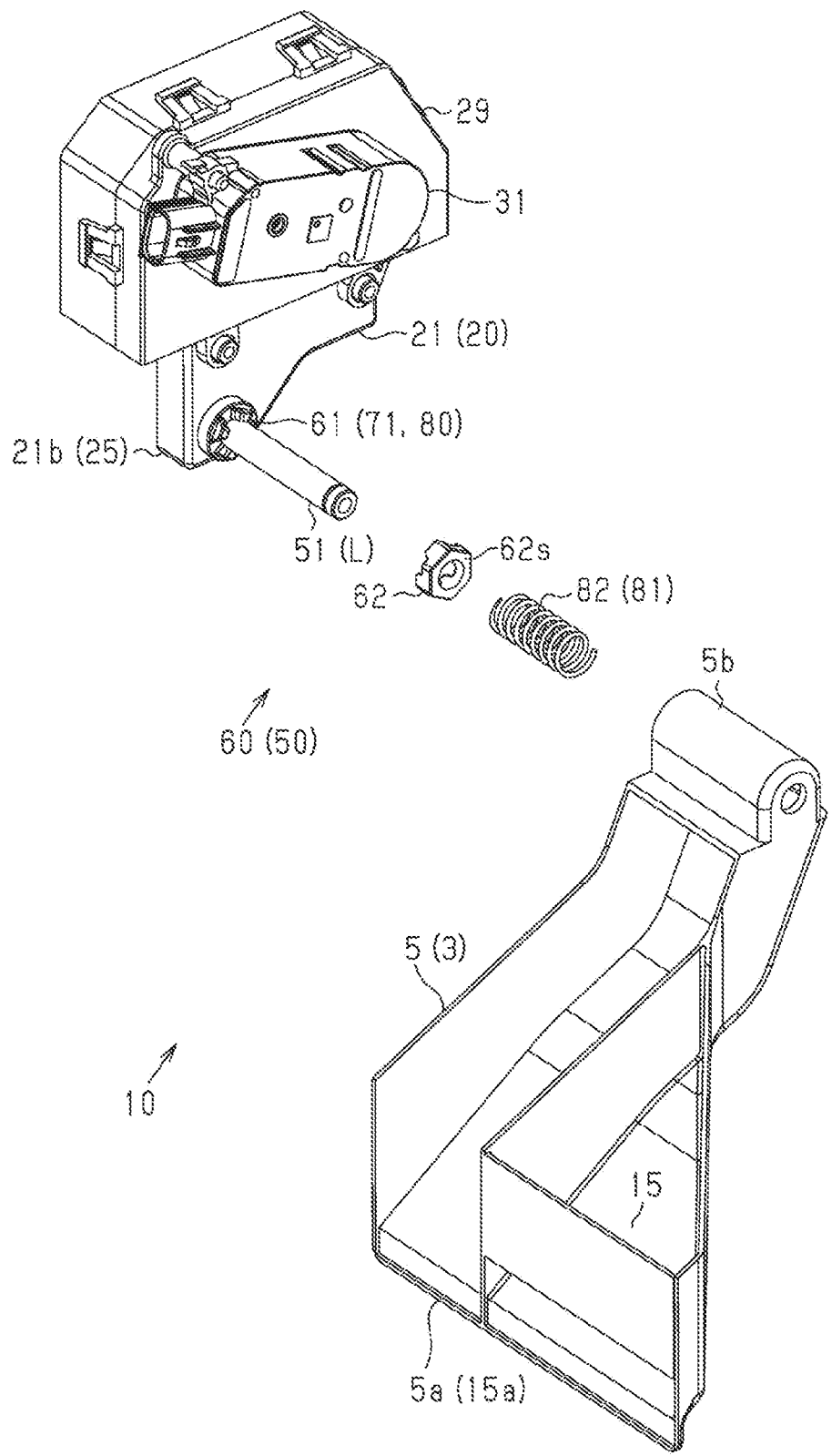
FIG. 7 is an exploded perspective view of the spat device.
Figure 8:
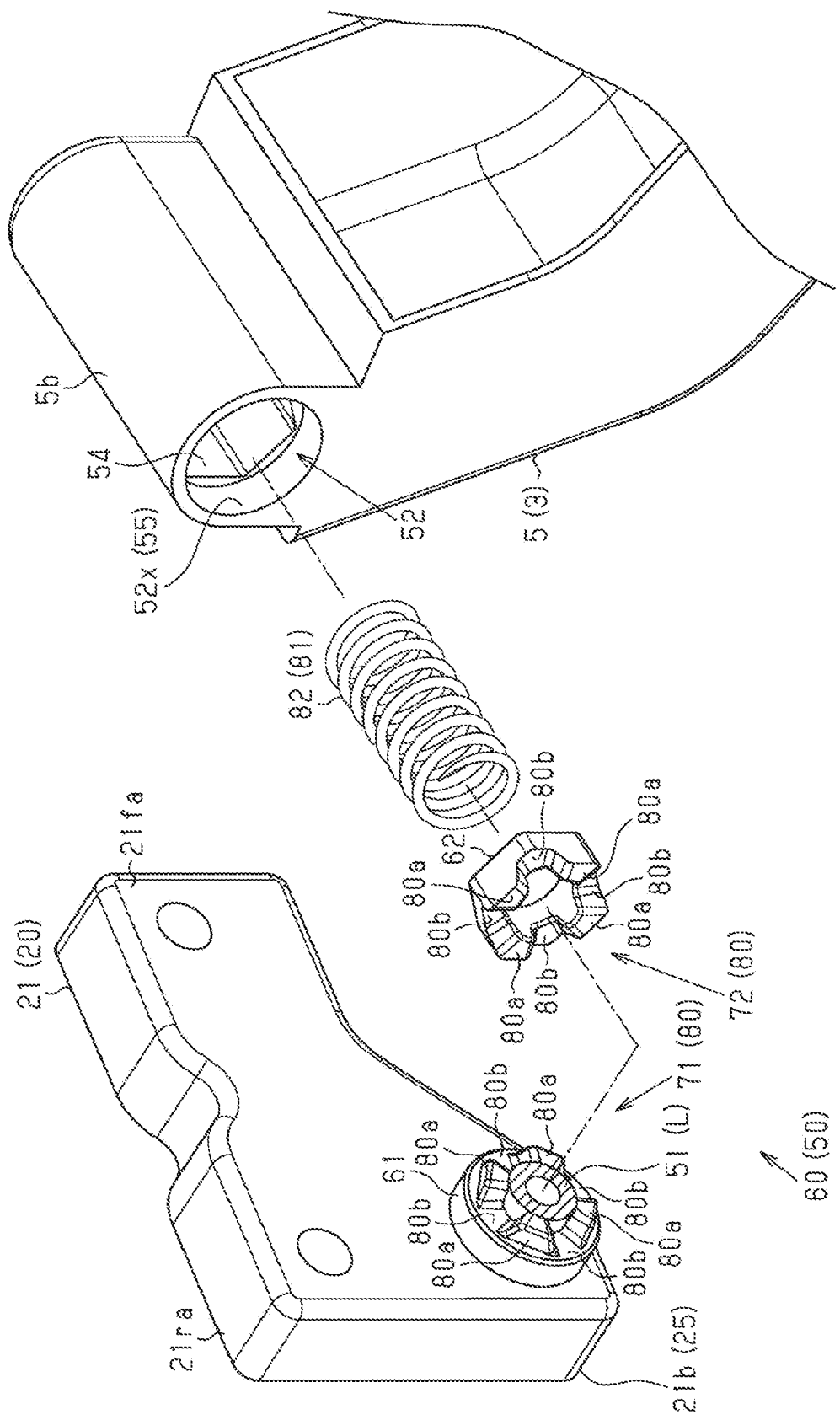
FIG. 8 is an exploded perspective view of a clutch mechanism that forms an impact relaxation mechanism.
Figure 9:
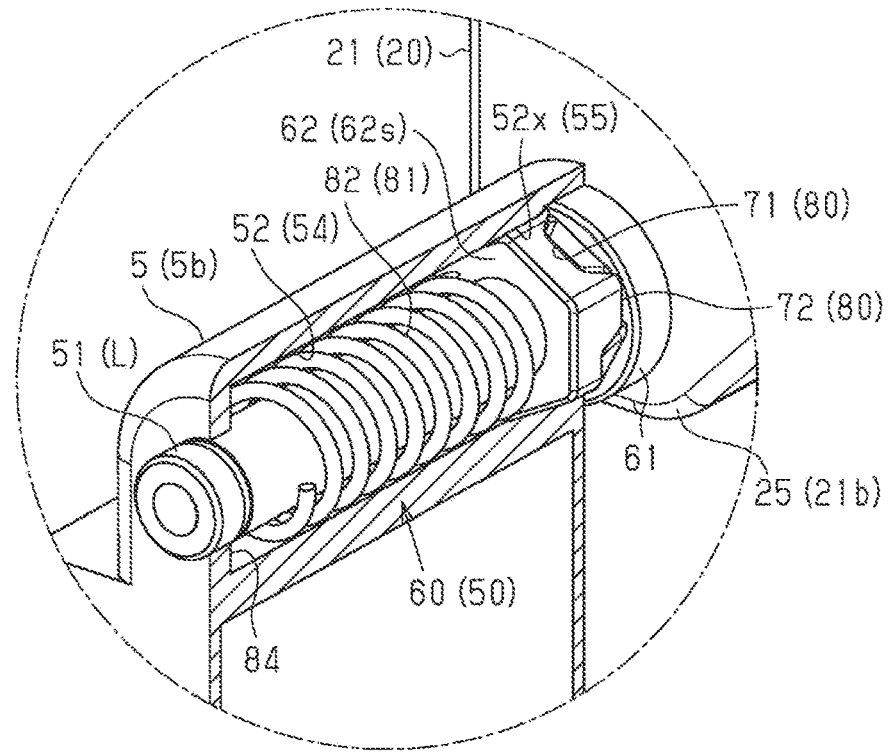
FIG. 9 is a partial cross-sectional view near the clutch mechanism.
Figure 10:
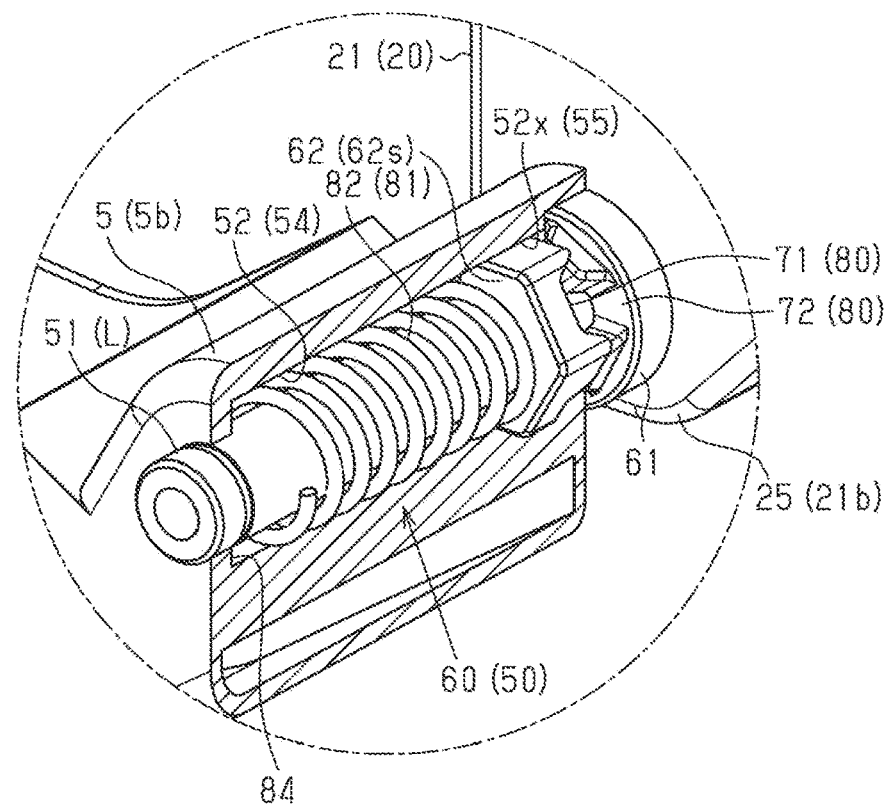
FIG. 10 is a partial cross-sectional view near the clutch mechanism.

As shown in FIGS. 5 and 6, the spat device 10 of the present embodiment includes an impact relaxation mechanism 50 that allows a retreating operation of the spat 5 accompanied by displacement when a large external force is input to the spat 5, for example, when the spat 5 interferes with an obstacle during traveling of the vehicle. In the spat device 10 of the present embodiment, the impact relaxation mechanism 50 is interposed between the variable support mechanism 20 and the spat 5. Specifically, the impact relaxation mechanism 50 is provided in the coupling portion 25 between the spat base 21 and the spat 5. Furthermore, the impact relaxation mechanism 50 is configured so that the spat 5 is relatively displaced with respect to the spat base 21 constituting the variable support mechanism 20 based on the input of an external force to the spat 5. Then, accordingly, the spat device 10 of the present embodiment is configured to allow the retreating operation of the spat 5 supported at the expanded position P1 and to allow the retreating operation of the spat 5 supported at the retracted position P0.

More specifically, as shown in FIGS. 4 to 7, the spat device 10 of the present embodiment includes a shaft-shaped protrusion 51 provided at the lower end 21*b* of the spat base 21 constituting the coupling portion 25 with the spat 5. In addition, an insertion hole 52 into which the shaft-shaped protrusion 51 is inserted is provided in the base end portion 5*b* of the spat 5. Specifically, the shaft-shaped protrusion 51 of the present embodiment is provided in a mode of protruding toward one side of the spat base 21 having a substantially flat plate-shaped outer shape. Furthermore, the shaft-shaped protrusion 51 on the spat base 21 side and the insertion hole 52 on the spat 5 side are provided in a mode of extending in the vehicle width direction in a state where the spat device 10 is mounted on the vehicle body 13. Then, the spat device 10 of the present embodiment is configured so that the spat base 21 and the spat 5 are pivotably coupled around the coupling shaft L formed by the shaft-shaped protrusion 51 inserted into the insertion hole 52.

In addition, the spat device 10 of the present embodiment includes a clutch mechanism 60 provided in the coupling portion 25 between the spat base 21 and the spat 5. In the spat device 10 of the present embodiment, the clutch mechanism 60 regulates the relative pivoting of the spat 5 around the coupling shaft L of the spat 5 with respect to the spat base 21 constituting the variable support mechanism 20. Furthermore, by an input of a predetermined or larger external force to the spat 5, based on the input of the external force, the clutch mechanism 60 allows relative pivoting of the spat 5 with respect to the spat base 21 around the coupling shaft L. Then, accordingly, the spat device 10 of the present embodiment is configured so that the clutch mechanism 60 forms the impact relaxation mechanism 50.

That is, as shown in FIGS. 5 and 6, in the spat device 10 of the present embodiment, for example, when an obstacle comes into contact with the spat 5 supported at the expanded position P1 from the vehicle front side, the clutch mechanism 60 is actuated based on input of an external force that presses the spat 5 rearward. In addition, when an obstacle comes into contact with the spat 5 supported at the retracted position P0, an external force in a direction of thrusting up the spat 5 from below is input. In the spat device 10 of the present embodiment, the clutch mechanism 60 is actuated even in such a case. That is, in the spat device 10 of the present embodiment, the impact relaxation mechanism 50 formed by the clutch mechanism 60 allows the retreating operation accompanied by the upward displacement of the spat 5 even in the region above the lower surface 13s of the vehicle body 13. Then, accordingly, the spat device 10 of the present embodiment is configured so that the retreating operation of the spat 5 accompanied by the upward displacement is allowed at both the expanded position P1 and the retracted position P0.

More specifically, as shown in FIGS. 7 to 10, the clutch mechanism 60 of the present embodiment includes a first engagement member 61 provided on the spat base 21 to be the variable support mechanism 20 side and a second engagement member 62 provided on the spat 5 side. In the spat device 10 of the present embodiment, the first engagement member 61 has a flat and substantially cylindrical outer shape. In addition, the second engagement member 62 has an outer shape of a flat substantially hexagonal tubular shape. Furthermore, the first engagement member 61 and the second engagement member 62 are disposed coaxially with the shaft-shaped protrusion 51 provided at a position to be the lower end 21b of the spat base 21. Then, the clutch mechanism 60 of the present embodiment is configured to regulate or allow the relative pivoting of the spat 5 with respect to the spat base 21 around the coupling shaft L formed by the shaft-shaped protrusion 51 based on the engagement state of the first engagement member 61 and the second engagement member 62.

Specifically, the first engagement member 61 of the present embodiment is fixed so as to be relatively non-rotatable with respect to the lower end 21b of the spat base 21. In addition, the second engagement member 62 is inserted into the insertion hole 52 provided in the base end portion 5b of the spat 5 together with the shaft-shaped protrusion 51 in a state of being fitted and inserted relatively rotatably and axially movably with respect to the shaft-shaped protrusion 51, Furthermore, the insertion hole 52 of the present embodiment has a hexagonal hole portion 54 with which the second engagement member 62 inserted into the insertion hole 52 is relatively non-rotatably and axially movably engaged. Then, accordingly, in the spat device 10 of the present embodiment, the first engagement member 61 and the second engagement member 62 constituting the clutch mechanism 60 are configured to relatively pivot with respect to each other based on the relative pivoting of the spat 5 with respect to the spat base 21.

It should be noted that in the spat device 10 of the present embodiment, a circular hole portion 55 is provided at the opening end 52x of the insertion hole 52. Then, the spat device 10 of the present embodiment is configured to house the first engagement member 61 fixed to the lower end 21b of the spat base 21 in the circular hole portion 55.

More specifically, in the clutch mechanism 60 of the present embodiment, the first engagement member 61 and the second engagement member 62 are coaxially arranged in a state where the first engagement surface 71 provided on the first engagement member 61 and the second engagement surface 72 provided on the second engagement member 62 face each other.

Furthermore, each of the first engagement surface 71 and the second engagement surface 72 has a configuration as a cam surface 80 in which a crest portion 80a and a trough portion 80b are alternately continuous around the coupling shaft L positioned at the pivoting center. Then, the clutch mechanism 60 of the present embodiment includes a biasing member 81 that generates a biasing force to press the first engagement surface 71 on the first engagement member 61 side and the second engagement surface 72 on the second engagement member 62 side against each other in the axial direction of the shaft-shaped protrusion 51 forming the coupling shaft L.

Specifically, the spat device 10 of the present embodiment includes a compression coil spring 82 to be inserted into the insertion hole 52 provided in the base end portion 5b of the spat 5 in a state where the compression coil spring 82 is fitted and inserted by the shaft-shaped protrusion 51 together with the second engagement member 62. Furthermore, the compression coil spring 82 is compressed in the axial direction by one end side abutting on the bottom portion 84 of the insertion hole 52 and the other end side abutting on the shaft end surface 62s of the second engagement member 62. Then, accordingly, the clutch mechanism 60 of the present embodiment is configured so that with the compression coil spring 82 as the biasing member 81, the second engagement surface 72 on the second engagement member 62 side and the first engagement surface 71 on the first engagement member 61 side biased in the axial direction are pressed against each other.

In addition, in the clutch mechanism 60 of the present embodiment, the first engagement member 61 and the second engagement member 62 are engaged in a state where the mutual crest portion 80a and the mutual trough portions 80b mesh with each other by the first engagement surface 71 and the second engagement surface 72 being pressed against each other. Then, accordingly, the clutch mechanism 60 of the present embodiment has a configuration in which the first engagement member 61 and the second engagement member 62 integrally pivot about the coupling shaft L based on the engagement force between the first engagement surface 71 and the second engagement surface 72 having a configuration as the cam surface 80.

Furthermore, the clutch mechanism 60 of the present embodiment allows the relative pivoting of the first engagement member 61 and the second engagement member 62 by the first engagement surface 71 and the second engagement surface 72 sliding about the coupling shaft L while relatively displaced in the axial direction against the biasing force of the compression coil spring 82. That is, in the clutch mechanism 60 of the present embodiment, the first engagement member 61 and the second engagement member 62 relatively pivot about the coupling shaft L in a mode in which the crest portion 80a of the first engagement surface 71 and the crest portion 80a of the second engagement surface 72 ride on each other. Furthermore, by the relative pivoting of the first engagement member 61 and the second engagement member 62, the second engagement member 62 is displaced in the axial direction while compressing the compression coil spring 82. Then, when a predetermined or larger external force is input to the spat 5 by the actuation of the clutch mechanism 60, the spat device 10 of the present embodiment is configured so that the spat 5 performs the retreating operation in a mode of relatively pivoting with respect to the spat base 21.

(Action)

Next, the action of the spat device 10 of the present embodiment configured as described above will be described.

Figure 11:
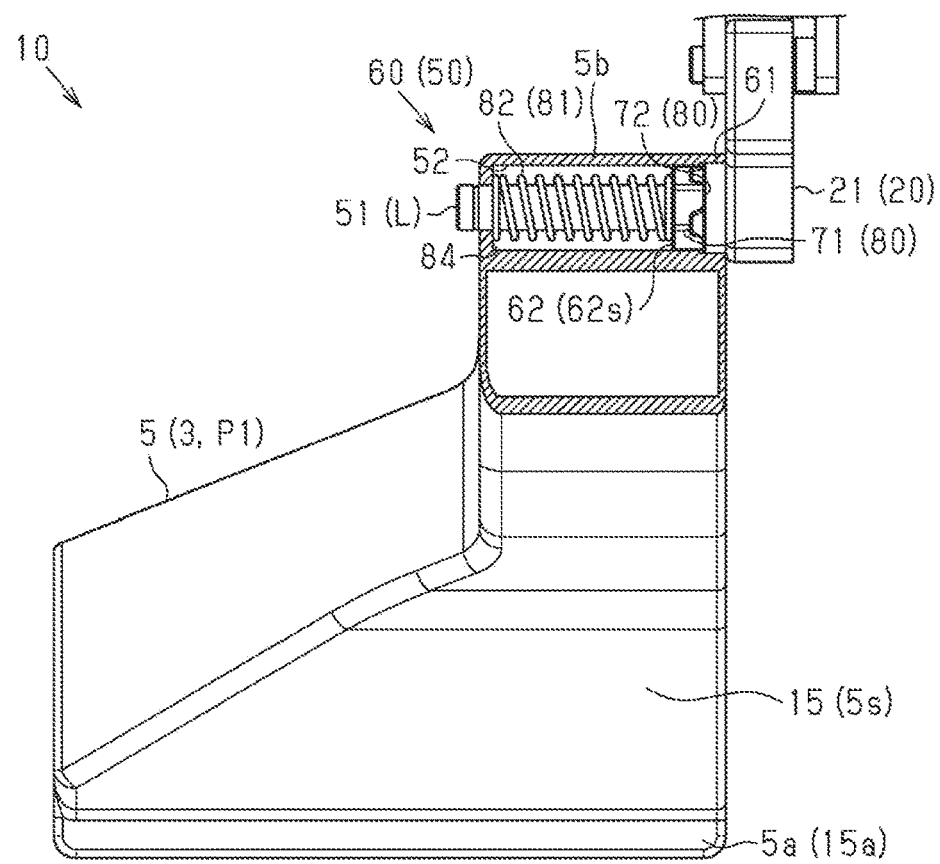
FIG. 11 is a front view of the spat device in a state where the spat is supported at an expanded position.
Figure 12:
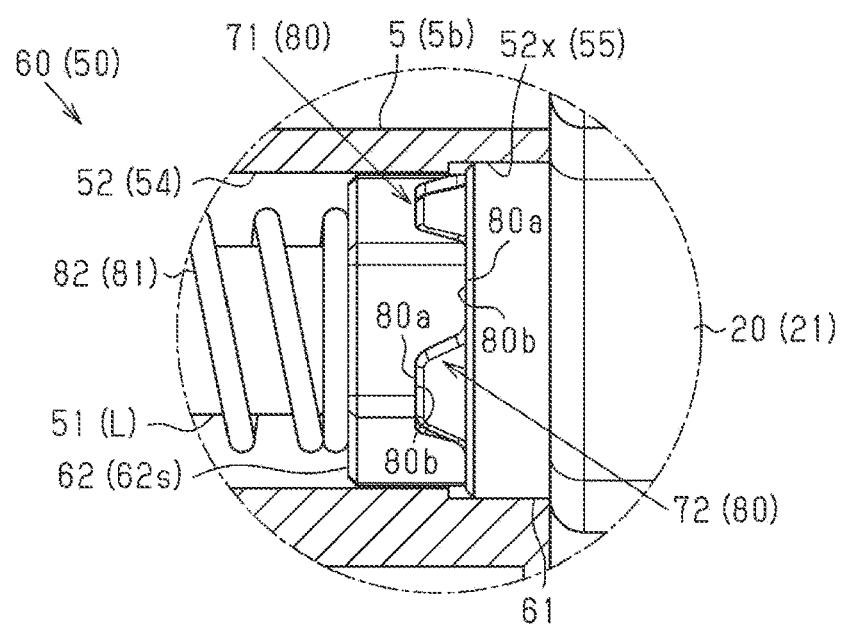
FIG. 12 is an enlarged view of a first engagement member and a second engagement member constituting the clutch mechanism.

That is, as shown in FIGS. 11 and 12, in the spat device 10 of the present embodiment, the clutch mechanism 60 is normally in a state in which the first engagement member 61 provided on the spat base 21 and the second engagement member 62 provided on the spat 5 are engaged with each other so as to be relatively non-pivotable. Then, accordingly, in the spat device 10 of the present embodiment, since the relative pivoting of the spat 5 supported at the expanded position P1 is regulated, the spat 5 effectively functions as the aerodynamic member 3 that straightens the traveling wind hitting the wheel 2 (see FIGS. 1 and 2).

Figure 13:
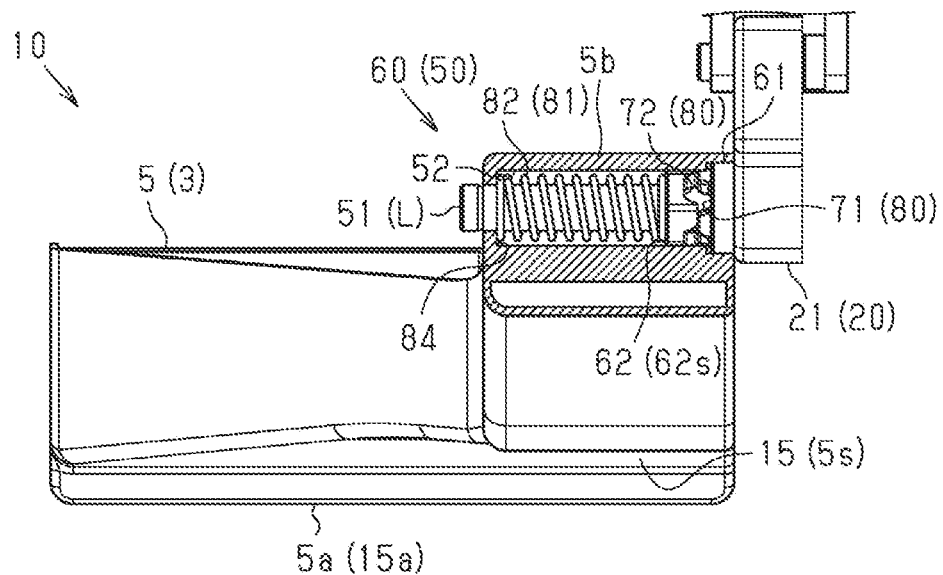
FIG. 13 is a front view of the spat device in a state in which the spat supported at the expanded position has performed retreating operation.
Figure 14:
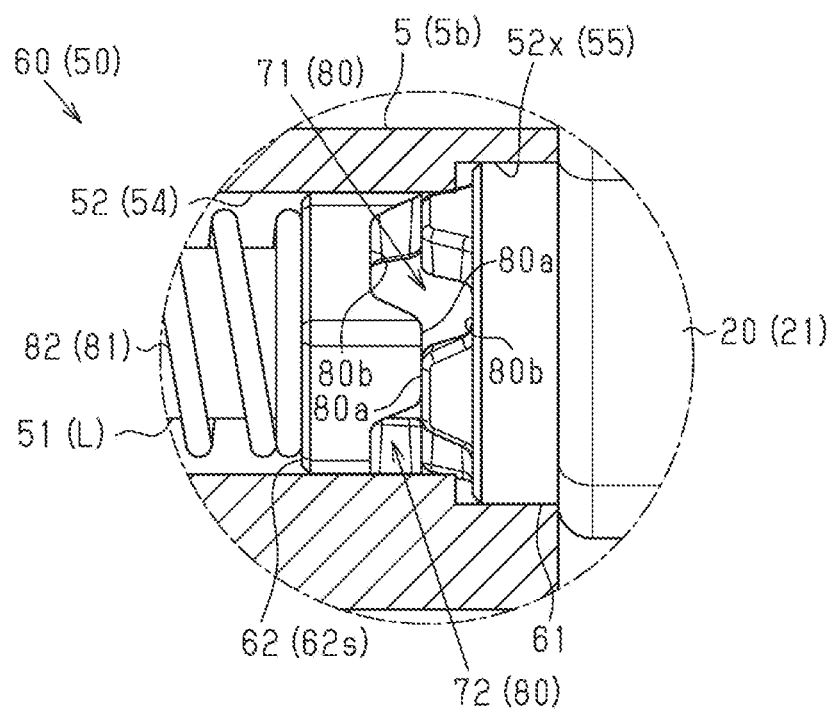
FIG. 14 is an enlarged view of a first engagement member and a second engagement member constituting the clutch mechanism.

Furthermore, as shown in FIGS. 13 and 14, in the clutch mechanism 60 of the present embodiment, such a large external force equal to or larger than a predetermined value as to compress the compression coil spring 82 is input to the spat 5, whereby the first engagement member 61 and the second engagement member 62 relatively pivot. That is, in the spat device 10 of the present embodiment, by the actuation of the clutch mechanism 60, the spat 5 disposed at the expanded position P1 relatively pivots with respect to the spat base 21 on the variable support mechanism 20 side around the coupling shaft L. Then, accordingly, in the spat device 10 of the present embodiment, since the spat 5 performs a retreating operation in a mode of the tip portion 5a to be lifted to the vehicle rear side, the impact load applied to the spat 5 from the vehicle front side is relaxed (see FIG. 5).

Figure 15:
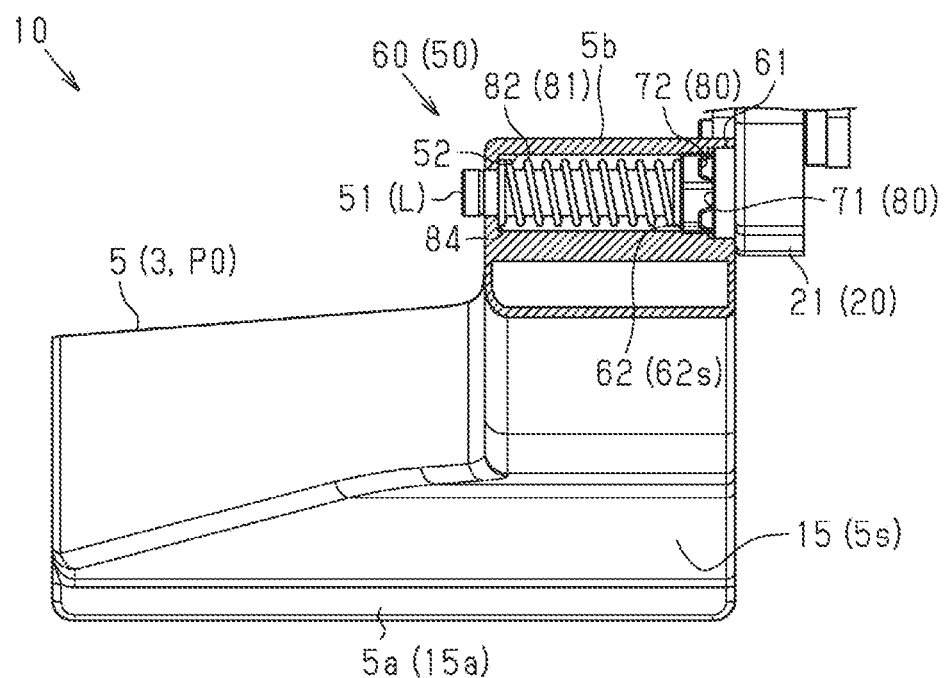
FIG. 15 is a front view of the spat device in a state where the spat is supported at a retracted position.
Figure 16:
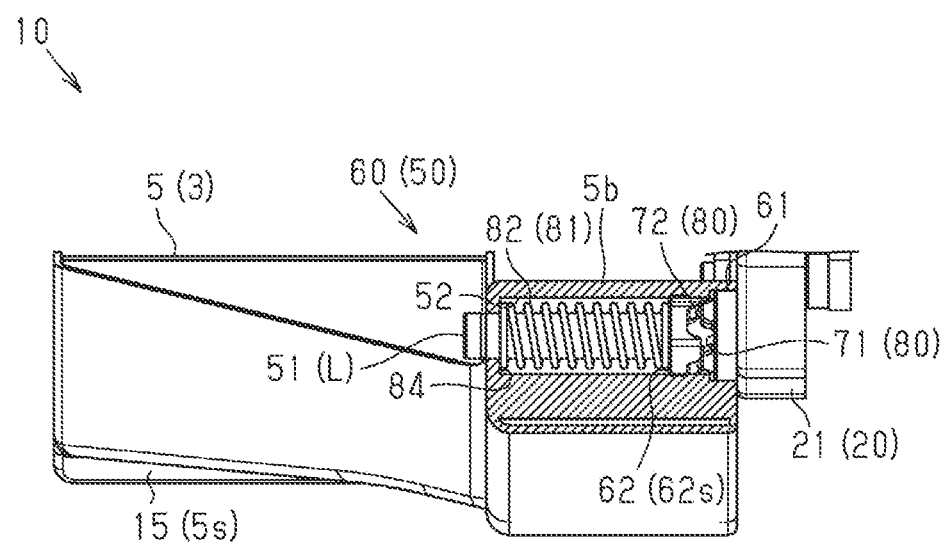
FIG. 16 is a front view of the spat device in a state in which the spat supported at the retracted position has performed retreating operation.

In addition, as shown in FIGS. 15 and 16, in the spat device 10 of the present embodiment, the clutch mechanism 60 functions as the impact relaxation mechanism 50, similarly even in a state where the spat 5 is supported at the retracted position P0.

That is, based on the biasing force of the compression coil spring 82, the first engagement member 61 and the second engagement member 62 constituting the clutch mechanism 60 are engaged so as to be relatively non-pivotable, whereby the spat 5 disposed at the retracted position P0 is stably supported. Furthermore, in the spat device 10 of the present embodiment, the spat 5 supported at the retracted position P0 is also allowed to relatively pivot with respect to the spat base 21 in a mode in which the tip 5a side is lifted upward toward the vehicle rear side based on the input of an external force. That is, also in this case, a predetermined or larger external force that compresses the compression coil spring 82 is input to the spat 5, whereby the first engagement member 61 and the second engagement member 62 constituting the clutch mechanism 60 relatively pivot about the coupling shaft L, Then, in the spat device 10 of the present embodiment, since the actuation of the clutch mechanism 60 causes the spat 5 supported at the retracted position P0 to perform retreating operation, the impact load applied to the spat 5 is relaxed (see FIG. 6).

Next, effects of the present embodiment will be described.

(1) The spat device 10 includes a variable support mechanism 20 that supports the spat 5 serving as an aerodynamic member 3 at an expanded position P1 in front of the wheel and a retracted position P0 separated from the expanded position P1. Furthermore, the spat device 10 includes an impact relaxation mechanism 50 that allows retreating operation accompanied by displacement of the spat 5 based on input of an external force to the spat 5. Then, the impact relaxation mechanism 50 allows the retreating operation of the spat 5 supported at the expanded position P1 and allows the retreating operation of the spat 5 supported at the retracted position P0.

That is, a vehicle spat device includes: a variable support mechanism configured to support a spat serving as an aerodynamic member at an expanded position in front of a wheel and a retracted position separated from the expanded position; an impact relaxation mechanism configured to allow retreating operation accompanied by displacement of the spat based on input of an external force to the spat; and a drive mechanism configured to apply a drive force to the variable support mechanism to cause the spat to operate between an expanded position and a retracted position as an operating range. The impact relaxation mechanism allows the retreating operation of the spat supported at the retracted position to a retreating position positioned further closer to a vehicle body side than the retracted position.

According to the above configuration, for example, even when an obstacle comes into contact with the spat 5 supported at the retracted position P0, the retreating operation of the spat 5 based on the input of the external force is enabled. Then, accordingly, the impact load applied to the spat 5 supported at the retracted position P0 can be effectively relaxed.

(2) The impact relaxation mechanism 50 is interposed between the variable support mechanism 20 and the spat 5 to allow the retreating operation based on a relative displacement of the spat 5 with respect to the variable support mechanism 20.

According to the above configuration, the spat 5 can be caused to perform retreating operation based on the actuation of the impact relaxation mechanism 50 regardless of the supporting position of the spat 5 by the variable support mechanism 20. That is, since the impact relaxation mechanism 50 actuates independently of the variable support mechanism 20, the spat 5 can be caused to perform retreating operation based on the input of the external force without involving the operation of the variable support mechanism 20. Then, accordingly, the impact load applied to the spat 5 supported at the retracted position P0 can be effectively relaxed.

Furthermore, according to the above configuration, the influence of the impact load applied to the spat 5 on the variable support mechanism 20 can be suppressed to be small. In addition, there is an advantage that the spat 5 can be quickly returned to the original supporting position after the retreating operation.

(3) A vehicle spat device includes: a variable support mechanism configured to support a spat serving as an aerodynamic member at an expanded position in front of a wheel and a retracted position separated from the expanded position: and an impact relaxation mechanism configured to allow retreating operation accompanied by displacement of the spat based on input of an external force to the spat. The impact relaxation mechanism is interposed between the variable support mechanism and the spat to allow the retreating operation based on a relative displacement of the spat with respect to the variable support mechanism.

According to the above configuration, the spat can be caused to perform retreating operation based on the actuation of the impact relaxation mechanism regardless of the supporting position of the spat by the variable support mechanism. That is, since the impact relaxation mechanism actuates independently of the variable support mechanism, the spat can be caused to perform retreating operation based on the input of the external force without involving the operation of the variable support mechanism. Then, accordingly, the impact load applied to the spat supported at the retracted position can be effectively relaxed.

Furthermore, according to the above configuration, the influence of the impact load applied to the spat on the variable support mechanism can be suppressed to be small. In addition, there is an advantage that the spat can be quickly returned to the original supporting position after the retreating operation.

(4) The spat 5 is relatively pivotably coupled to the variable support mechanism 20. Then, the impact relaxation mechanism 50 is configured, around the coupling shaft L with respect to the variable support mechanism 20, using a clutch mechanism 60 that regulates the relative pivoting of the spat 5 and allows the relative pivoting being based on the input of the external force with respect to the spat 5.

That is, in the vehicle spat device, the impact relaxation mechanism is configured using a clutch mechanism that regulates relative pivoting of the spat and allows relative pivoting of the spat based on input of the external force around a coupling shaft of the spat relatively pivotably coupled to the variable support mechanism.

According to the above configuration, regardless of the supporting position of the spat 5 by the variable support mechanism 20, the retreating operation of the spat 5 based on the input of the external force can be allowed in a mode in which the spat 5 relatively pivots about the coupling shaft L with respect to the variable support mechanism 20. Then, accordingly, the impact load applied to the spat 5 supported at the retracted position P0 can be effectively relaxed.

(5) The clutch mechanism 60 includes: a first engagement member 61 provided on the variable support mechanism 20 side, and a second engagement member 62 provided on the spat 5 side. The first engagement member 61 and the second engagement member 62 integrally pivot about the coupling shaft L of the spat 5 with respect to the variable support mechanism 20 by being engaged with each other. Then, the first engagement member 61 and the second engagement member 62 are configured to relatively pivot by the external force exceeding mutual engagement force being input to the spat 5.

That is, in the vehicle spat device, the clutch mechanism includes: a first engagement member provided on the variable support mechanism side, and a second engagement member provided on the spat side. The first engagement member and the second engagement member are configured to integrally pivot about the coupling shaft by being engaged with each other, and relatively pivot by the external force exceeding mutual engagement force being input to the spat.

According to the above configuration, with a simple configuration, it is possible to form a clutch mechanism 60 that regulates the relative pivoting of the spat 5 and allows the relative pivoting based on the input of the external force with respect to the spat 5 around the coupling shaft L with respect to the variable support mechanism 20. Then, based on the actuation of the impact relaxation mechanism 50 configured using the clutch mechanism 60, the impact load applied to the spat 5 supported at the retracted position P0 can be effectively relaxed.

(6) The clutch mechanism 60 includes a compression coil spring 82 as a biasing member 81 that presses the first engagement surface 71 on the first engagement member 61 side and the second engagement surface 72 on the second engagement member 62 side against each other in the axial direction of the coupling shaft L of the spat 5 with respect to the variable support mechanism 20. The first engagement surface 71 and the second engagement surface 72 have a configuration as cam surfaces 80 in which a crest portion 80a and a trough portion 80b are alternately continuous around the coupling shaft L. In addition, in the clutch mechanism 60, the first engagement member 61 and the second engagement member 62 integrally pivot based on the engagement force of the first engagement surface 71 and the second engagement surface 72 engaged with each other based on the biasing force of the compression coil spring 82. Furthermore, the clutch mechanism 60 is configured so that the first engagement member 61 and the second engagement member 62 slide around the coupling shaft L while being relatively displaced in the axial direction against the biasing force of the compression coil spring 82. Then, accordingly, the clutch mechanism 60 allows the relative pivoting of the first engagement member 61 and the second engagement member 62 based on the input of the external force to the spat 5.

That is, in the vehicle spat device, the clutch mechanism includes a biasing member configured to press a first engagement surface on a side of the first engagement member and a second engagement surface on a side of the second engagement member against each other in an axial direction of the coupling shaft. The first engagement surface and the second engagement surface are cam surfaces in which a crest portion and a trough portion are alternately continuous around the coupling shaft. The first engagement member and the second engagement member integrally pivot based on an engagement force of the first engagement surface and the second engagement surface engaged with each other based on a biasing force of the biasing member. Sliding of the first engagement surface and the second engagement surface around the coupling shaft while relatively displaced in the axial direction against the biasing force allows relative pivoting of the first engagement member and the second engagement member based on input of the external force.

According to the above configuration, based on the biasing force of the compression coil spring 82 constituting the biasing member 81, the magnitude of the external force that allows the relative pivoting of the first engagement member 61 and the second engagement member 62, that is, the retreating operation of the spat 5 can be controlled. Then, accordingly, it is possible to form an impact relaxation mechanism 50 capable of maintaining a stable support state of the spat 5 by the variable support mechanism 20 with a simple configuration and appropriately allowing the retreating operation of the spat 5 when a large external force equal to or larger than a predetermined value is input.

(7) The variable support mechanism 20 includes: a spat base 21 to which the spat 5 is to be coupled, and a plurality of link members 22 to be pivotably coupled to the spat 5 and a vehicle body 13.

According to the above configuration, by the four-node link mechanism 30 formed by the spat base 21 and the link members 22, the spat 5 can be caused to smoothly perform expanding and retracting operations, and can be stably supported at the expanded position P1 and the retracted position P0. Furthermore, there is an advantage that the impact relaxation mechanism 50 can be easily interposed between the variable support mechanism 20 and the spat 5. Then, accordingly, the impact load applied to the spat 5 supported at the retracted position P0 can be effectively relaxed.

(8) When an external force in a direction of thrusting up the spat 5 from below is input to the spat 5 supported at the retracted position P0, the impact relaxation mechanism 50 is configured to allow a retreating operation from the retracted position P0.

That is, in the vehicle spat device, the impact relaxation mechanism allows the retreating operation when the external force in a direction of thrusting up the spat from below is input to the spat supported at the retracted position.

According to the above configuration, usually, the retracted position P0 of the spat 5 is set at a position where the spat 5 is separated upward from the expanded position P1. Therefore, the input of the external force to the spat 5 supported at the retracted position P0 is likely to thrust up the spat 5 from below. Therefore, according to the above configuration, the impact load applied to the spat 5 supported at the retracted position P0 can be more effectively relaxed.

(9) The impact relaxation mechanism 50 is configured to allow the spat 5 to perform the retreating operation above a lower surface 13s of a vehicle body 13 based on input of the external force to the spat 5 supported at the retracted position P0.

According to the above configuration, the impact load applied to the spat 5 supported at the retracted position P0 can be more effectively relaxed.

(10) The spat device 10 includes a drive mechanism 40 that applies a drive force to the variable support mechanism 20 to cause the spat 5 to perform expanding and retracting operations.

According to the above configuration, it is possible to improve convenience by providing this drive mechanism 40. Furthermore, according to the above configuration, it is possible to suppress the influence of the impact load applied to the spat 5 on the drive mechanism 40 by the actuation of the impact relaxation mechanism 50. In particular, in a state where the spat 5 is supported at the retracted position P0, usually, an absorption margin of an impact load that can be relaxed by the drive mechanism 40, for example, a surplus stroke or the like is small.

(11) The variable support mechanism 20 moves the spat 5 from the expanded position P1 to the retracted position P0 by the retracting operation in the direction of lifting the spat 5 to the vehicle front side. Then, when an external force is input to the spat 5, the spat 5 performs retreating operation in a direction of being lifted upward toward the vehicle rear side by the actuation of the impact relaxation mechanism 50.

According to the above configuration, the variable support mechanism 20 is configured so that the impact relaxation mechanism 50 causes the spat 5 to perform the retracting operation in a direction different from the direction that allows the retreating operation of the spat 5. By adopting this configuration, the impact relaxation mechanism 50 can be more effectively actuated independently of the variable support mechanism 20, Then, accordingly, the influence of the impact load applied to the spat 5 on the variable support mechanism 20 can be suppressed to be smaller.

(12) The drive mechanism 40 is configured to regulate the expanding and retracting operations based on the reverse input with respect to the spat 5 by forming the turnover mechanism 45.

According to the above configuration, the impact relaxation mechanism 50 can be more effectively actuated independently of the variable support mechanism 20. Then, accordingly, it is possible to suppress the influence of the impact load applied to the spat 5 on the variable support mechanism 20 and the drive mechanism 40 to be smaller.

It should be noted that the above embodiment can be modified and implemented as follows. The above embodiment and the following modification can be implemented in combination with each other within a scope not technically contradictory.

The configuration of the clutch mechanism 60 forming the impact relaxation mechanism 50 may be optionally modified. For example, the engagement shapes of the first engagement member 61 and the second engagement member 62 such as the surface shapes of the first engagement surface 71 and the second engagement surface 72 having the configuration as the cam surfaces 80 may be optionally changed. In addition, for example, a configuration using a biasing member 81 other than the compression coil spring 82 may be used. Furthermore, without using such a biasing member 81, the first engagement member 61 and the second engagement member 62 held in the engaged state may be disengaged when the spat 5 performs retreating operation based on the input of the external force. Then, the clutch mechanism 60 may be configured to include elements other than the first engagement member 61 and the second engagement member 62. That is, as the impact relaxation mechanism 50, the relative pivoting of the spat 5 around the coupling shaft L with respect to the variable support mechanism 20 is regulated, and the relative pivoting based on the input of the external force with respect to the spat 5 is enabled, whereby the retreating operation of the spat 5 has only to be allowed.

In addition, the impact relaxation mechanism 50 may be formed by a configuration other than the clutch mechanism 60. For example, a biasing member such as a torsion coil spring is disposed for the coupling shaft L of the spat 5 with respect to the variable support mechanism 20, Furthermore, the spat 5 coupled to the variable support mechanism 20 is supported at the expanded position P1 and the retracted position P0 based on the biasing force of the biasing member. Then, by the input of an external force against the biasing force of the biasing member to the spat 5, the spat 5 may be configured to perform retreating operation.

In the above embodiment, the impact relaxation mechanism 50 is interposed between the variable support mechanism 20 and the spat 5. However, the present disclosure is not limited thereto, and the configuration of the impact relaxation mechanism 50 may be optionally changed in arrangement, operation, and the like. That is, the configuration has only to allow the retreating operation of the spat 5 supported at the expanded position P1 and to allow the retreating operation of the spat 5 supported at the retracted position P0. For example, the impact relaxation mechanism 50 may be formed by an impact-absorbing member provided in the variable support mechanism 20. It should be noted that in this case, it is preferable to set a surplus stroke in which the spat 5 supported at the retracted position P0 can perform retreating operation to the variable support mechanism 20. Then, in addition, the retreating operation of the spat 5 is not necessarily limited to the relative pivoting with respect to the variable support mechanism 20 that supports the spat 5, and for example, the spat 5 may be configured to perform retreating operation by the displacement in the sliding direction by the input of the external force.

The setting of the expanded position P1, the attitude of the spat 5 supported at the expanded position P1, and the like may be optionally changed. Then, the retracted position P0, the attitude of the spat 5 supported at the retracted position P0, and the Ike may also be optionally changed.

For example, in the above embodiment, the tip 15a of the flap portion 15 is disposed above the lower surface 13s of the vehicle body 13 in a state where the spat 5 is supported at the retracted position P0. However, the present disclosure is not limited thereto, and for example, the spat 5 may be supported at the retracted position P0 in a state where a part of the flap portion 15 protrudes downward from the lower surface 13s of the vehicle body 13.

In addition, in the above embodiment, the impact relaxation mechanism 50 is configured to allow the spat 5 to perform the retreating operation above a lower surface 13s of a vehicle body 13 based on input of the external force to the spat 5 supported at the retracted position P0. However, the present disclosure is not limited thereto, and a part of the spat 5 supported at the retracted position P0 may be disposed below the lower surface 13s of the vehicle body 13 during the retreating operation of the spat 5. That is, the impact load applied to the spat 5 supported at the retracted position P0 has only to be allowed to be effectively relaxed. However, from the viewpoint of relaxing the impact load, it is more preferable that the stroke of the retreating operation is larger.

In a state where the spat 5 is supported at the retracted position P0, the input direction of the external force by which the impact relaxation mechanism 50 actuates is not necessarily limited to the external force in the direction of thrusting up the spat 5 from below.

In the above embodiment, the variable support mechanism 20 includes: a spat base 21 to which the spat 5 is to be coupled, and a plurality of link members 22 to be pivotably coupled to the spat 5 and a vehicle body 13. However, the present disclosure is not limited thereto, and the configuration of the variable support mechanism 20 may be optionally changed.

In addition, in the above embodiment, the variable support mechanism 20 moves the spat 5 supported at the retracted position P0 to the expanded position P1 in a mode of pulling down the spat 5 to the vehicle rear side during the expanding operation. Then, at the time of retracting operation, the spat 5 supported at the expanded position P1 is moved to the retracted position P0 in a mode of being lifted to the vehicle front side. However, the present disclosure is not limited thereto, and at the time of the expanding operation and the retracting operation of the spat 5 by the actuation of the variable support mechanism 20, the direction, attitude, and the like in which the spat 5 moves may be optionally changed.

In the above embodiment, the spat device 10 includes a drive mechanism 40 that applies a drive force to the variable support mechanism 20 to cause the spat 5 to perform expanding and retracting operations. In addition, the drive mechanism 40 includes: an output lever 33 that pivots integrally with an output shaft 32 of an actuator 31 using a motor as a drive source, and a coupling link 35 pivotably coupled to the output lever 33. Then, the drive mechanism 40 transmits the drive force of the actuator 31 to the variable support mechanism 20 by pivotably coupling the coupling link 35 to the spat base 21 constituting the variable support mechanism 20, However, the present disclosure is not limited thereto, and the configuration of the drive mechanism 40 may be optionally changed. Then, a configuration without a power source such as the actuator 31 may be used, and for example, a configuration in which the drive force by the manual operation of the user is transmitted to the variable support mechanism 20 through a wire cable or the like may be used.

In the above embodiment, the spat device 10 is provided at a position in front of the wheel house 12 housing the front wheel 2f of the vehicle 1. However, the present disclosure is not limited thereto, and for example, a wheel 2 which the spat 5 is disposed in front of, such as providing the spat 5 in front of the rear wheel, may be optionally set. Then, the shape and size of the spat 5 may also be optionally changed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle spat device comprising:
a variable support mechanism configured to support a spat serving as an aerodynamic member at an expanded position in front of a wheel and a retracted position separated from the expanded position;
an impact relaxation mechanism configured to allow retreating operation accompanied by displacement of the spat based on input of an external force to the spat; and
a drive mechanism configured to apply a drive force to the variable support mechanism to cause the spat to operate between an expanded position and a retracted position as an operating range,
wherein the impact relaxation mechanism allows the retreating operation of the spat supported at the retracted position to a retreating position positioned further closer to a vehicle body side than the retracted position.

2. The vehicle spat device according to claim 1, wherein the impact relaxation mechanism is interposed between the variable support mechanism and the spat to allow the retreating operation based on a relative displacement of the spat with respect to the variable support mechanism.

3. A vehicle spat device comprising:
a variable support mechanism configured to support a spat serving as an aerodynamic member at an expanded position in front of a wheel and a retracted position separated from the expanded position; and
an impact relaxation mechanism configured to allow retreating operation accompanied by displacement of the spat based on input of an external force to the spat,
wherein the impact relaxation mechanism is interposed between the variable support mechanism and the spat to allow the retreating operation based on a relative displacement of the spat with respect to the variable support mechanism, and
wherein the impact relaxation mechanism is configured using a clutch mechanism that regulates relative pivoting of the spat and allows relative pivoting of the spat based on input of the external force around a coupling shaft of the spat relatively pivotably coupled to the variable support mechanism.

4. The vehicle spat device according to claim 3, wherein the clutch mechanism includes
a first engagement member provided on the variable support mechanism side, and
a second engagement member provided on the spat side, and
the first engagement member and the second engagement member are configured to integrally pivot about the coupling shaft by being engaged with each other, and relatively pivot by the external force exceeding mutual engagement force being input to the spat.

5. The vehicle spat device according to claim 4, wherein the clutch mechanism includes a biasing member configured to press a first engagement surface on a side of the first engagement member and a second engagement surface on a side of the second engagement member against each other in an axial direction of the coupling shaft,
the first engagement surface and the second engagement surface are cam surfaces in which a crest portion and a trough portion are alternately continuous around the coupling shaft,
the first engagement member and the second engagement member integrally pivot based on an engagement force of the first engagement surface and the second engagement surface engaged with each other based on a biasing force of the biasing member, and sliding of the first engagement surface and the second engagement surface around the coupling shaft while relatively displaced in the axial direction against the biasing force allows relative pivoting of the first engagement member and the second engagement member based on input of the external force.

6. The vehicle spat device according to claim 1, wherein the variable support mechanism includes a spat base to which the spat is to be coupled, and a plurality of link members to be pivotably coupled to the spat and a vehicle body.

7. The vehicle spat device according to claim 1, wherein the impact relaxation mechanism allows the retreating operation when the external force in a direction of thrusting up the spat from below is input to the spat supported at the retracted position.

8. The vehicle spat device according to claim 1, wherein the impact relaxation mechanism is configured to allow the spat to perform the retreating operation above a lower surface of a vehicle body based on input of the external force to the spat supported at the retracted position.

* * * * *